United States Patent [19]

Guillon

[11] Patent Number: 5,563,663
[45] Date of Patent: Oct. 8, 1996

[54] METHOD FOR THE SYNCHRONIZATION OF CONTROL FUNCTIONS WITH VIDEO SIGNALS IN A TELEVISION RECEIVER AND DEVICE FOR THE IMPLEMENTATION THEREOF

[75] Inventor: Jean-Claude Guillon, Gerstheim, France

[73] Assignee: Thomson Consumer Electronics, Courbevoie, France

[21] Appl. No.: 180,786

[22] Filed: Jan. 10, 1994

Related U.S. Application Data

[63] Continuation of Ser. No. 808,621, Dec. 17, 1991, abandoned.

[30] Foreign Application Priority Data

Dec. 21, 1990 [FR] France .................. 90 16134

[51] Int. Cl.$^6$ ................... H04N 5/445
[52] U.S. Cl. ............ 348/468; 348/563; 348/589; 386/46
[58] Field of Search ................ 348/589–600, 348/563–566, 569, 734, 468, 500; 358/335, 183, 148; 345/113–115, 186–188, 192–194; H04N 5/44, 5/445, 5/45, 5/50, 5/262, 5/265, 5/272, 5/275, 5/278, 7/08, 7/087

[56] References Cited

U.S. PATENT DOCUMENTS

| | | | |
|---|---|---|---|
| 4,420,770 | 12/1983 | Rahman | 348/589 |
| 4,602,286 | 7/1986 | Kellar et al. | 358/183 |
| 4,631,585 | 12/1986 | Wine | 558/148 |
| 4,748,504 | 5/1988 | Ikeda et al. | 558/183 X |
| 4,774,583 | 9/1988 | Kellar et al. | 358/183 |
| 4,835,611 | 5/1989 | Nishitani | 358/160 |
| 4,855,831 | 8/1989 | Miyamoto et al. | 348/586 |
| 4,962,428 | 10/1990 | Tong et al. | 558/188 |
| 5,003,393 | 3/1991 | Riegel | 558/160 |
| 5,077,608 | 12/1991 | Dubner | 345/113 X |

FOREIGN PATENT DOCUMENTS

| | | | |
|---|---|---|---|
| 0018169 | 1/1982 | Japan | 358/148 |
| 0018168 | 1/1982 | Japan | 358/148 |
| 0206787 | 8/1989 | Japan | H04N 7/160 |
| 0248771 | 10/1989 | Japan | H04N 5/278 |
| 0266591 | 10/1989 | Japan | 345/187 |
| 0224583 | 9/1990 | Japan | H04N 5/278 |

*Primary Examiner*—David E. Harvey
*Attorney, Agent, or Firm*—Oblon, Spivak, McClelland, Maier & Neustadt, P.C.

[57] ABSTRACT

A device which comprises a memory memorizing, in addition to the RGB components of the digitized video signal and one bit per pixel for the usual control of fast blanking activating the display of characters, at least one bit per pixel for the control of the recording, on a video cassette recorder, of sub-titles but not of menus.

7 Claims, 5 Drawing Sheets

1

METHOD FOR THE SYNCHRONIZATION OF CONTROL FUNCTIONS WITH VIDEO SIGNALS IN A TELEVISION RECEIVER AND DEVICE FOR THE IMPLEMENTATION THEREOF

This application is a continuation of application Ser. No. 07/808,621, filed on Dec. 17, 1991, now abandoned.

BACKGROUND OF THE INVENTION

1. Field of the Invention

The present invention relates to a method for the synchronization of control functions with video signals in a television receiver as well as a device for the implementation of this method.

The television receiver has long been the instrument used to reproduce images received by an antenna and has been in instrument that can in no way be used to modify or create new images. This situation has begun to change with the appearance of integrated circuits and the creation of a data transmission system, namely the teletext system. Today, the television set is used not only to display teletext pages but also a menu. The menu is the element that enables an interactive control of the television set: the user's commands are sent to the television set by means of the remote control unit.

The commands or controls that prompt the display of the pages of text inform the user about the action resulting from his commands or guide him in his subsequent choices.

The new D2-MAC packet standard enables a novel application of these character generators: for, it provides the possibility of transmitting sub-titles in digital form and of controlling their display from the receiver. Thus, with his television set, the user now has at his disposal an image generator which, as the case may be, displays pages of teletext, sub-titles or a menu. It is clear that this list is not exhaustive and will become longer in the future.

In coming years, most television sets will include a character generator enabling a menu to be displayed on the television screen. The advantage of this approach is that it reduces the cost of the control function while the same time improving the reliability of the television set by reducing the number of push-buttons on the remote control unit.

2. Description of the Prior Art

The architecture of the television set corresponding to the usual case is shown in FIG. 1.

In the block diagram of this FIG. 1, the antenna 1 is connected to the intermediate frequency reception and amplification circuits 2. The demodulated output of the circuits 2 is connected to the input of a video cassette recorder 3 and to an input of a switch 4, the other input of which is connected to the output of the video cassette recorder 3. The output of the switch 4 is connected to two processing channels. The first of these channels has a chrominance decoder 5 and a RGB matrix 6. The second channel has a data separator 7 (namely data such as teletext data) and a character generator 8 with which there is associated a memory 8A. The character generator 8 is controlled by a microcontroller 9 that works in cooperation with a remote control box 10 (generally infrared). The RGB outputs of the circuits 6 and 8 are each connected to an input of a switch 11 that is followed by a video amplifier 12 and the cathode-ray tube 13. The switch 11 is controlled by the generator 8.

It can be seen that, in a system such as this, the video cassette recorder never records the output of the character generator. It is clear that this architecture cannot be used when a D2-MAC packet decoder is used: in fact it is indispensable, in this case, to record the sub-titles when they exist.

In the block diagram of FIG. 2, the same elements as those of FIG. 1 are assigned the same numerical references. The antenna 1 of the television set of FIG. 2 is connected, firstly, to a first intermediate output frequency tuner 2A that relates to the amplitude modulated channel and has a reduced sideband.

The antenna 1 is furthermore connected to a second intermediate frequency tuner 2B, relating to the frequency D2-MAC modulation channel.

The output of the tuner 2A is connected to a first input of a switch 4A with three inputs and to the input of the video cassette recorder 3, the output of which is connected to a second input of the switch 4A. The third input of the switch is connected to the CVBS (Composite Video Baseband Signal) output of the tuner 2B. The switch 4A is followed, firstly, by the circuits 5, 6, 11 and 12, and, secondly, by the circuits 7 and 8. A switch 14 is interposed between the circuits 8 and 11. The generator 8 is controlled by the microcontroller 9 cooperating with the remote control unit 10.

Downline from the D2-MAC output of the tuner 2B, there are respectively connected a MAC decoder 15, a data separator 16, a character generator 17 and a switch 18, one input of which is connected to the decoder 15, this switch 18 being controlled by the generator 17 with which a memory 17a is associated. The output of the switch 18 is connected to an input of the switch 14 and a PAL coder 19, the output of which is connected to the video cassette recorder 3'. An output of the generator 8 is connected to a free input of an OR gate, the other input of which receives the D2-MAC signals from the tuner 2B. These D2-MAC signals also control the switch 14.

Thus, in the device of FIG. 2, it can be seen that the D2-MAC decoder 15 and the associated character generator 17 are designed as an independent sub-assembly. In this case, the television set has two character generators 8 and 17, and notably one character generator used only for the sub-titles (17). The video cassette recorder connected to the PAL encoder therefore records only the sub-titles and not the menu (which is produced by the character generator 8). The major drawback of the approach is its cost: for, it is necessary to use two character generators.

A more economical approach used INTERMETALL brand digital integrated circuits. Its architecture has been designed so that the D2-MAC circuit and the character generator generate the basic elements of a complete device.

FIG. 3 shows the new circuits of this approach. The other circuits (not shown) are those connected upline (intermediate frequency tuner in particular) giving the D2-MAC and CVBS signals, and those connected downline (video circuits receiving the RGB video signal).

This device of FIG. 3 includes an analog/digital converter 21, the output bus 22 of which is connected to: a scanning processor 23 for the cathode-ray tube of the television set, a video processor 24, a MAC decoder 25 and a CVBS data separator 26. The output bus of the circuits 24 and 25 are connected to a digital/analog converter 27. The decoder 25 is connected to a MAC data separator 27. The decoder 25 is connected to a data separator MAC 28, which is itself connected to a data generator 29. This generator 29 is also connected to the CVBS separator 26. The output of the generator 29 is connected to the converter 27. The RGB analog output of the converter 27 is, firstly, connected to the video circuits (not shown) of the television set and, secondly, to an encoder 30 which is a PAL encoder herein. The output of the encoder 30 is connected to the video cassette recorder 31.

It is therefore possible, in this circuit of FIG. 3, to use only one character generator. However, it is then no longer possible to distinguish the characters corresponding to the sub-title from those corresponding to a menu, and it is doubtful whether the user would wish to record the menu on his video cassette recorder.

SUMMARY OF THE INVENTION

An object of the present invention is a method that enables the control, in a television receiver, of several functions such as the inhibition of the recording of menus, a method that is simple to implement even for several different functions, and can be implemented in synchronization with the video signals displayed on the screen of the receiver.

An object of the present invention is also a device for the implementation of this method, in particular an image synthesis device that is inexpensive, especially in that it uses only one character generator to create a menu and sub-titles.

The method according to the invention is based on a video signal digitized on P bits, an insertion control (or command) bit being associated with these P bits, wherein L bits are added to these P+1 bits, with P and $L \geq 1$, the L bits corresponding to commands synchronized with the signals displayed on the screen of the receiver. According to one aspect of this method, at least one of these L bits is used to control the recording of at least one part of the video signals, these video signals possibly including synthesis signals produced by a generator associated with the receiver.

The device according to the invention includes a memory associated with a generator of video signals, for example a character generator, wherein the memory includes at least one input/output connected to devices for the control of functions that have to be synchronized with the video signals, and wherein the memory is addressed by a line counter and a column counter receiving the vertical and horizontal pulses of the video signals. According to one embodiment of the invention, at least one of the input/output wires is connected to a generator of synthesis signals, such as a character generator, and to the recording command of a recording device.

BRIEF DESCRIPTION OF THE DRAWINGS

The present invention will be understood more clearly from the detailed description of an embodiment, taken as a non-restrictive example and illustrated by the appended drawings, of which.

DETAILED DESCRIPTION OF THE INVENTION

Figure 1:
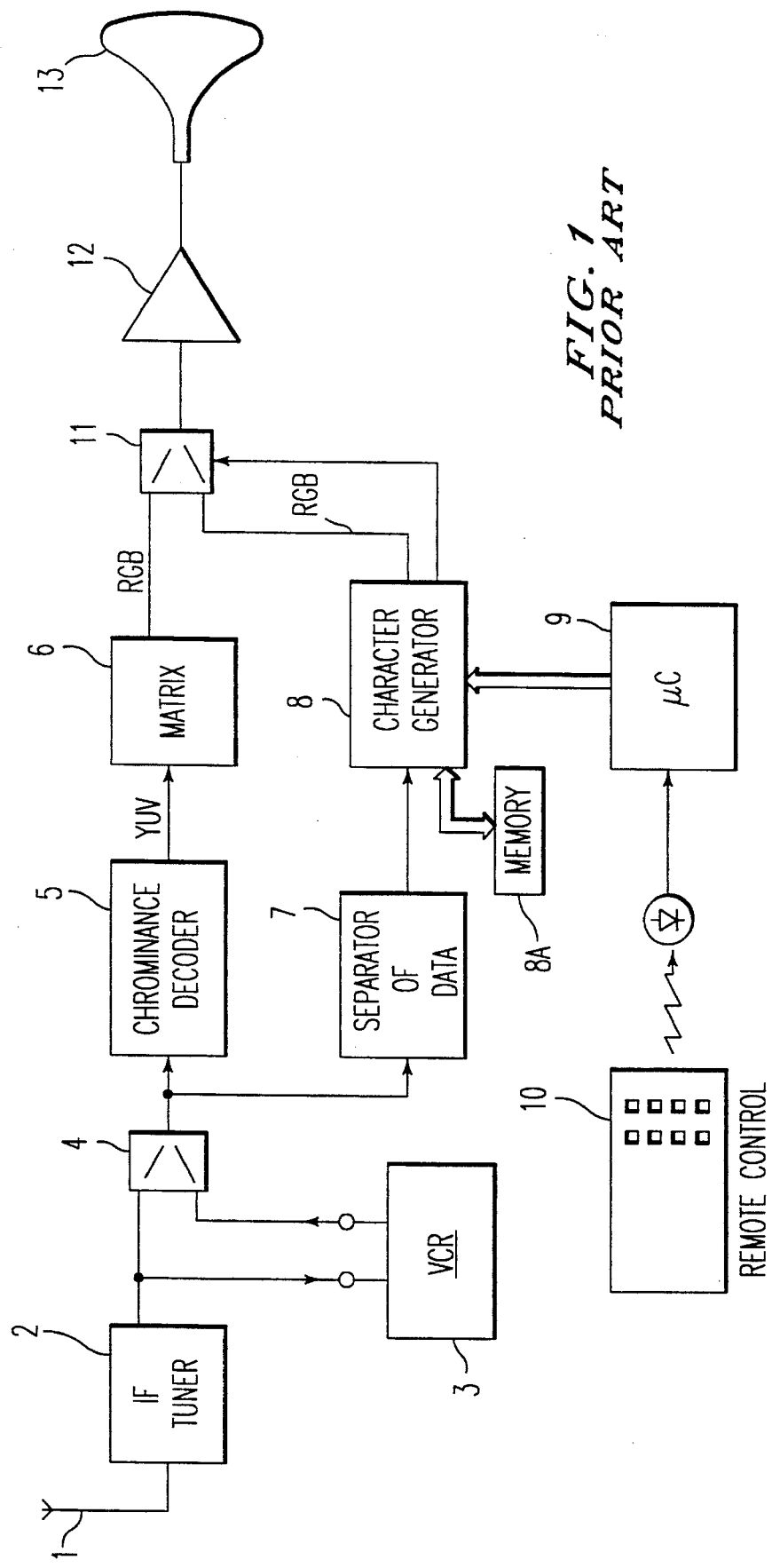
FIGS. 1 to 3, already referred to here above, refer to prior art devices.
Figure 2:
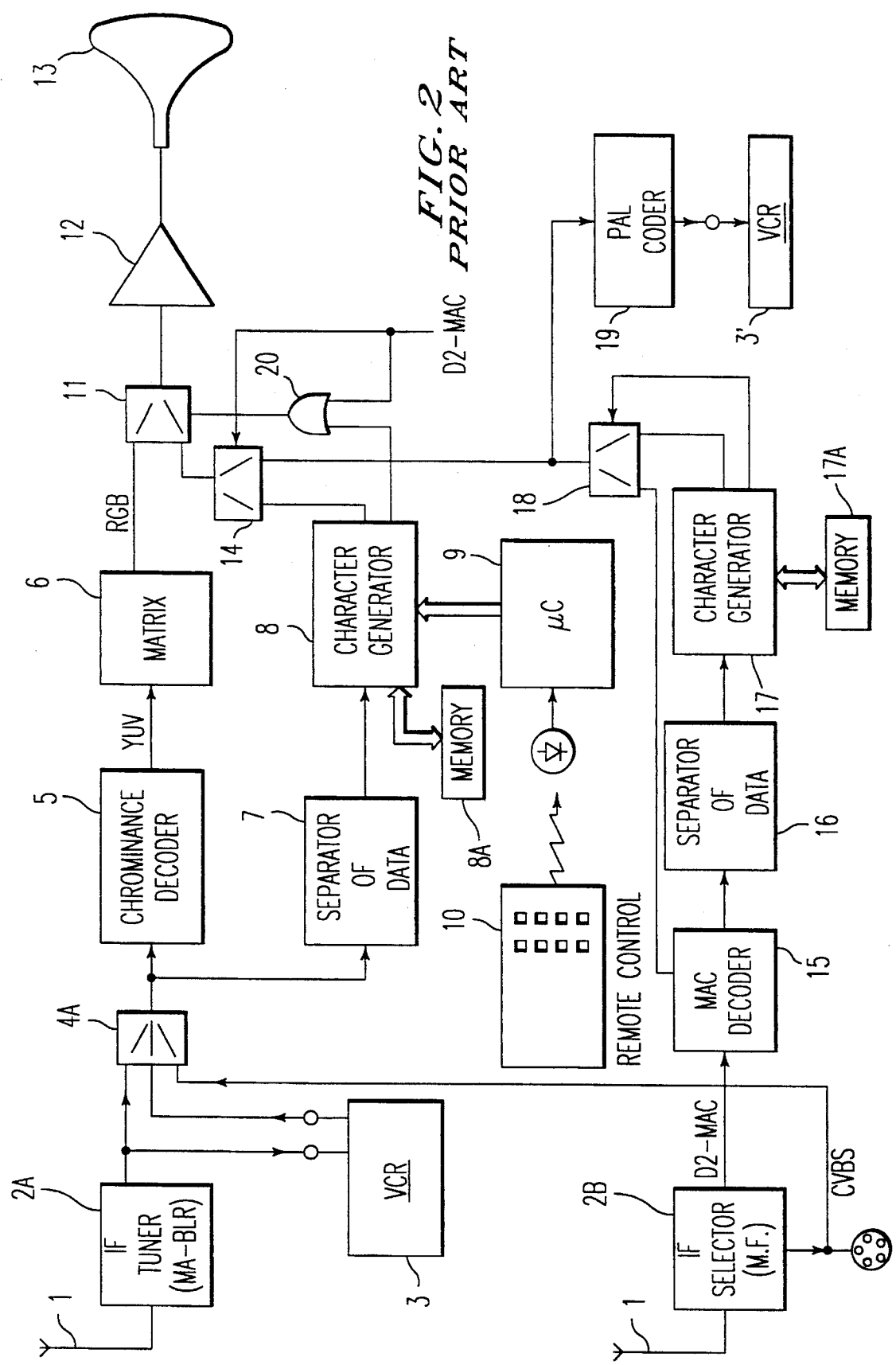
Figure 3:
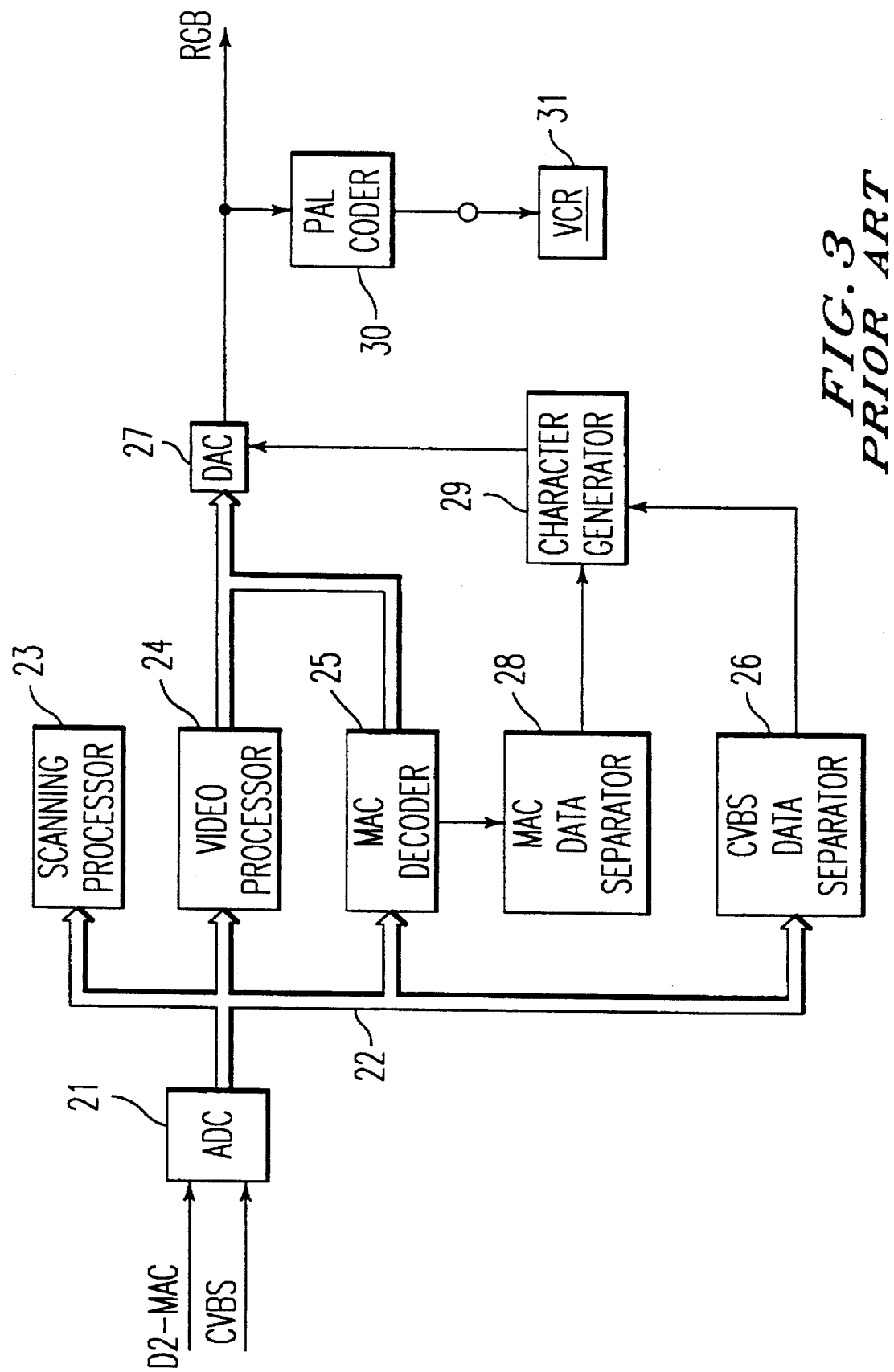

The present invention is based on a commonly used character generator (for example the circuit TPU 2733). The insertion of the output signal of this character generator in the video signal is validated by a so-called "fast blanking" signal. The invention uses this character generator to make it give at least one second "fast blanking" signal to control the recording function. These additional signals enable the production of at least one insertion window synchronous with the image displayed.

The production of additional signals such as these makes uses of techniques that are well known per se for the display on the screen of characters produced by character generators.

A first approach consists in using a memory in which the image to be displayed is stored. Each character or each pixel of the screen is represented by one or more binary numbers. Should only one bit be assigned to each primary component of the image (Red, Green, Blue), 3 bits are used for each pixel of the image. According to the known technique, an additional bit is assigned to each pixel to produce the commonly used "insertion control" (or insertion command) information. According to the invention, a fifth bit is added to each pixel to produce a second insertion control, in order to indicate whether or not the information should be recorded in the video cassette recorder. These controls or commands are associated with the character generator (8), 29 with which the memory is associated, on the basis of the commands that it receives from the video chain. The character generator writes in the memory 32 at low frequency (only when the text to be displayed has to be modified), but the reading of the memory is done at the video frequency. The position of the text on the screen is defined by the horizontal and vertical synchronization signals. In practice, the embodiment relates to the physical structure of each integrated circuit. It is thus that if we consider a standard generator of teletext characters, one page of text is represented by 35 lines of 40 characters each, each letter being defined by a byte. A memory of one kilobyte is thus needed to represent a page of characters. Each byte is converted into characters by means of a character generator proper. In general, a line is transferred to the page memory in a buffer memory on the chip. This buffer memory feeds the character generator in real time, and this character generator gives the video signals R, G, B.

The insertion control signal may be prepared in different ways. One approach consists in using a bit of the byte representing a character to report the fact that the insertion signal is active. The use of a second bit thus enables the supply of a second independent insertion signal. To prevent any reduction in the number of characters that may be represented, it is also possible to extend the byte representing a character from 8 to 10 bits.

Another way of defining the insertion signal consists in defining one insertion beginning address and one insertion end address. If the memory is organized in 25 lines of 40 characters, this approach will use a line counter and a column counter that are associated, for each insertion signal, with comparators.

Figure 4:
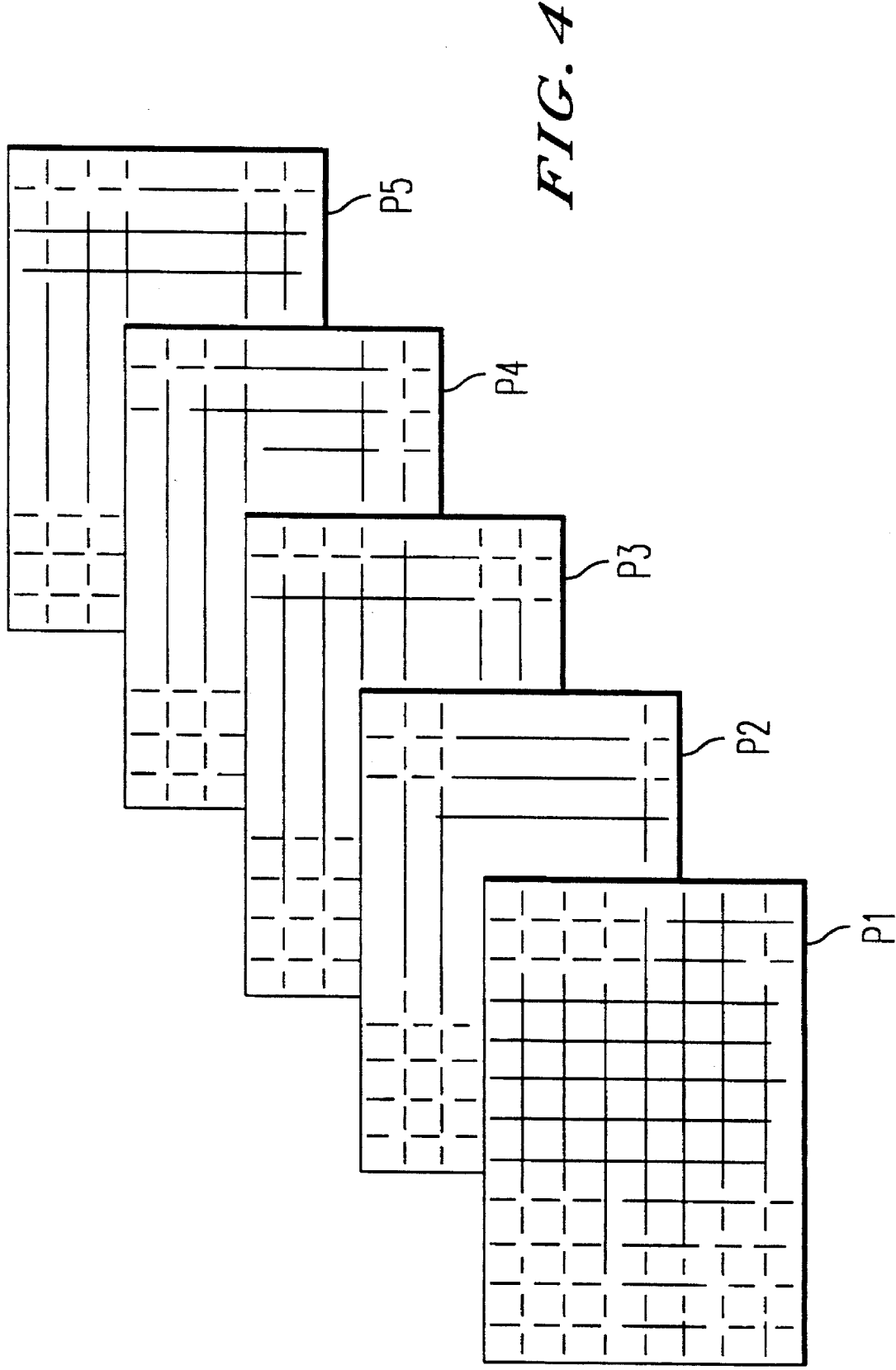
FIG. 4 is a diagram that shows the R, G, B and insertion pages, the latter being implemented by the present invention.

FIG. 4 shows five memory "pages" P1 to P5. Each of these pages has a capacity of one frame. For the convenience of the depiction, each page takes the form of a rectangular matrix with M columns and N lines, corresponding to a screen image with M pixels per line and N lines. The first three pages P1 to P3 respectively correspond to the components R, G, B of the pixels of each frame. The fourth page P4 memorizes the usual insertion control ("yes" or "no" on only one bit) for each pixel of each frame. The fifth page P5 memorizes, for each pixel of each frame, the command on one bit for the recording or non-recording of the corresponding pixel on the video cassette recorder. Naturally, these "pages" P1 to P4 are not physically demarcated but each of them corresponds to M×N addresses of a random-access memory of frames. It is also clear that it is possible to implement a greater number of additional "pages", P6, P7, . . . to fulfil other functions: such as recording on a device other than the video cassette recorder in question, alarms, special effects etc.

Figure 5:
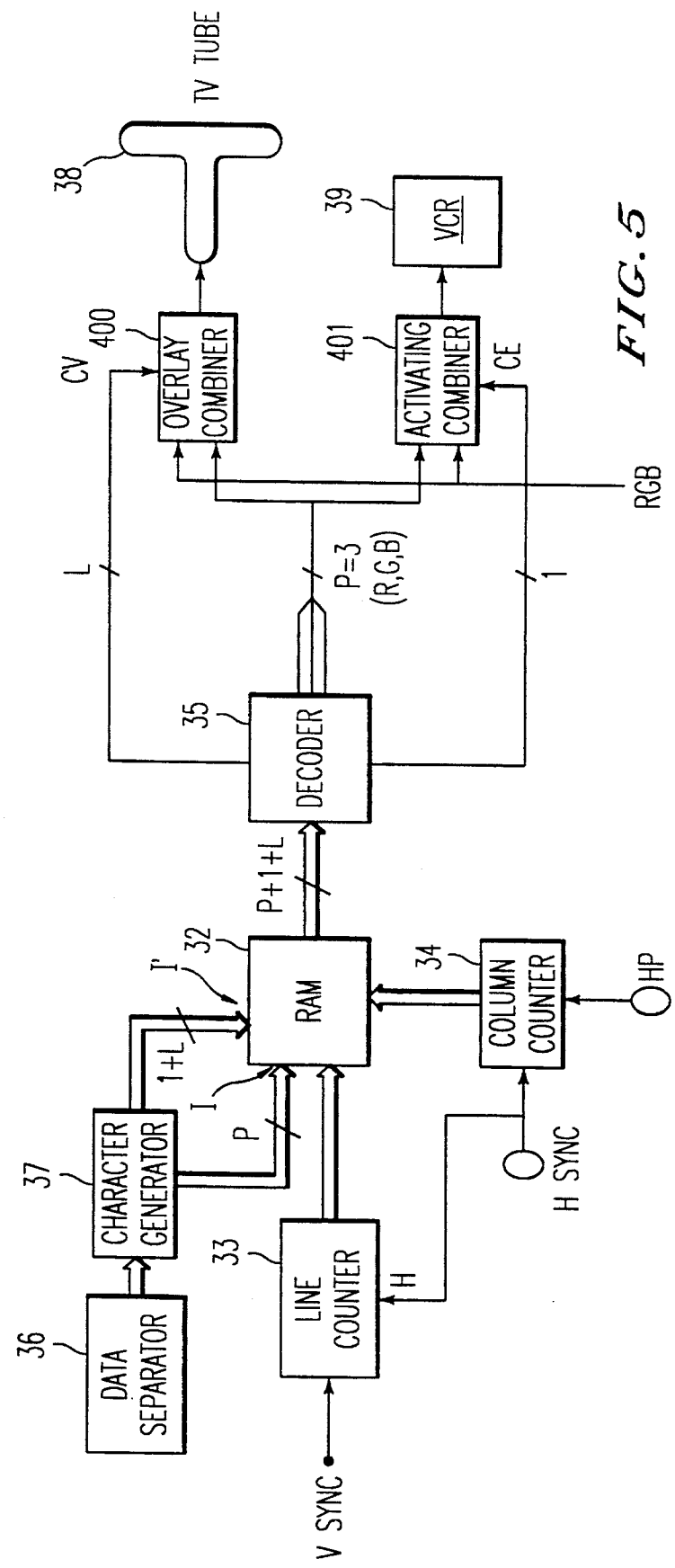
FIG. 5 is a block diagram of a device according to the invention.

FIG. 5 shows a block diagram of a possible embodiment of a circuit for the implementation of the invention. The memory of this circuit is connected to the data separator 36 and the single character generator 37 of the receiver or forms part of the integrated circuit containing this generator. This character generator produces the characters both for the menus and for the sub-titles that have to be recorded.

The circuit of FIG. 5 has a memory 32 receiving, at inputs I, and I' the characters to be displayed, and to be recorded if necessary. Switches 40 and 41 may be the same kind of switches as, for example, switches 11 and 4 of FIG. 1 in order to provide the first and second "blanking signals" to validate the video signal and to control the VCR 39. Although the input and the output of a memory such as those used at present are generally one and the same unit, they have been shown separately in the drawing for the clarity of the explanations. The memory 32 is organized in P identical "pages" each comprising N "lines" and M "columns" that correspond to the N lines and M columns of pixels of the video image. Naturally, this memory may be constituted by P identical circuits that are placed in parallel and are each capable of memorizing at least M×N bits, or else a memory with at least P output bits, with at least M×N addresses. As specified here above, P is at least equal to 1.

The memory 32 is addressed by a line counter 33 and by a column counter 34. Furthermore, through the character generator (37), in the case of a D2-MAC packet decoder, the input I of the memory 32 receives the command signals coming from the data separator 36 to record sub-titles if any.

If there are plans for other types of functions that have to be synchronized with the image displayed on the screen of the receiver, a correlative increase in made in the capacity of the cells of the memory 32, the number of bits of the input I and of the output O as well as the capacity of the decoding circuit (circuit 35 described here below).

The commands sent to the inputs I and I' may be transmitted either individually on an individual wire or multiplexed (by time-division multiplexing or different modulations of one and the same carrier) on a same wire.

The resetting input RESET of the counter 33 receives the vertical synchronization signal V sync of the video signal, and its counting input receives the horizontal synchronization signal H sync of the video signal. This signal H sync is also sent to the resetting input RESET at the counter 34, the counting input of which receives pixel clock signals HP, namely synchronization signals arriving at the frequency of the pixels. The signals V sync, H sync and HP are obtained in the usual way.

The reading output O of the memory 32 (on P bits) is connected to a decoding circuit 35. This circuit 35 may be a simple buffer circuit separating the different signals that come to the outputs O of the memory 32. These signals are naturally the RGB components of the video signal, a command CV for the display, on the screen of the receiver, of the sub-titles and/or menus using overlay combining device 400, memorized in the page P4 and the recording command CE according to the invention activating by the activation combining device 401 the recording on a video cassette recorder of sub-titles (but not menus). Naturally, if the number of "pages" of the memory 32 is greater than five, the circuit 35 has other other additional outputs similar to the output CE. Naturally again, if more than one binary number is assigned to each primary component (R, G, B) of the image, the circuit 35 has a corresponding number of outputs homologous to the outputs RGB.

What is claimed is:

1. A method for the synchronization of control functions with video signals in a receiver, said method comprising the steps of:

providing data which defines elements of at least part of a video image, each element being coded on P bits;

scanning said data to provide a first video signal;

associating an insertion control bit with each of said P bit elements to form P+1 bits wherein said insertion control bit controls a display signal function to be performed on said first video signal;

adding L bits to said P+1 bits wherein both P and L are at least equal to 1 and wherein said L bits define at least a recording function which is a function distinct from said display signal function and which recording function is to be performed on said first video signal.

2. A method according to claim 1, wherein said first video signal is provided by a synthesis video signal generator associated with the receiver.

3. A method according to claim 2, wherein the synthesis signals generator comprises a character generator.

4. A method for the synchronization of control functions with video signals according to claim 2, wherein:

said scanning is controlled to be synchronous with a second video signal, video signal recording means are associated with said television receiver, a first insertion of said first video signal into said second video signal is controlled by said control signal corresponding to said insertion control bit, the resulting video signal being destined to be displayed by said receiver, a second insertion of said first video signal into said second video signal is controlled by the control signal corresponding to one of said L bits, the resulting video signal being destined to be recorded by said video signal recording means.

5. A method according to claim 4 wherein said one of said L bits is set to one when said data corresponds to subtitles.

6. A method according to claim 2, wherein said recording function comprises control in an insertion of said first video signal into a second video signal, the resulting video signal being output to a video recorder.

7. A device for the synchronization of control functions with video signals in a television receiver, said device comprising:

a memory comprising an output connected to control apparatus for the control of said functions which require synchronization with said video signals, a character generator connected to an input of said memory, a line counter and a column counter receiving vertical and horizontal synchronization pulses and addressing said memory, a decoder connected to the output of said memory and producing first video signals, a first control signal and at least a second control signal from data read from said memory, said control apparatus comprising a first and second combining device each of said first and second combining devices receiving said first video signals and second video signals, wherein said first combining device is controlled by said first control signal and is connected to a display device and wherein said second combining device is controlled by at least one of said second control signals, the output of said second combining device being connected to an input of a recording device which is separate from said display device.

* * * * *